United States Patent

Sity

[11] Patent Number: 5,966,504
[45] Date of Patent: Oct. 12, 1999

[54] APPARATUS AND METHOD FOR PRINTING

[75] Inventor: Refael Yacov Sity, Kfar Saba, Israel

[73] Assignee: Scitex Corporation Ltd., Herzlia, Israel

[21] Appl. No.: 08/823,506

[22] Filed: Mar. 24, 1997

[30] Foreign Application Priority Data

Mar. 24, 1996 [IL] Israel .......................................... 117632

[51] Int. Cl.$^6$ .............................. B41B 15/00; H04N 1/46
[52] U.S. Cl. ........................ 395/109; 395/109; 395/114; 358/515; 358/537; 358/538; 364/468.01
[58] Field of Search ............................ 395/109; 358/515, 358/537, 538, 109; 364/468.01

[56] References Cited

U.S. PATENT DOCUMENTS

| | | | |
|---|---|---|---|
| 4,571,603 | 2/1986 | Hornbeck et al. | 346/460 |
| 5,049,901 | 9/1991 | Gelbart | 346/108 |
| 5,309,244 | 5/1994 | Katagiri et al. | 358/296 |
| 5,398,082 | 3/1995 | Henderson et al. | 348/781 |
| 5,410,370 | 4/1995 | Janssen | 348/756 |
| 5,416,514 | 5/1995 | Janssen et al. | 348/196 |
| 5,428,467 | 6/1995 | Schmidt | 359/40 |
| 5,450,219 | 9/1995 | Gold et al. | 359/40 |
| 5,457,566 | 10/1995 | Sampsell et al. | 359/292 |
| 5,552,994 | 9/1996 | Cannon et al. | 364/468.01 |

FOREIGN PATENT DOCUMENTS

| | | | |
|---|---|---|---|
| 1513519 | 10/1989 | U.S.S.R. | G11C 13/04 |
| 2279845 | 6/1994 | United Kingdom | H04N 1/23 |

*Primary Examiner*—Edward L. Coles
*Assistant Examiner*—Twyler Lamb
*Attorney, Agent, or Firm*—Darby & Darby

[57] ABSTRACT

A system and method for employing a digital representation of a color image to be printed in a printing system is provided. The method includes generating at least one raster representation of the color image to be printed and a run length representation of the color image wherein the high resolution representation includes a plurality of files, each file storing information representing a single color to be printed; and a run length file including at least the run length information of the color to be printed. Preferably, each one of the plurality of files including at least an indication for each pixel whether to print the raster representation or the run length representation. The method also includes providing the raster representation and the run length representation to printing apparatus.

40 Claims, 6 Drawing Sheets

APPARATUS AND METHOD FOR PRINTING

FIELD OF THE INVENTION

The present invention relates to printing systems and methods employing data in a high resolution format and a low resolution format generally and more particularly to digital printing systems and methods employing data in the Line Work (LW) format and the Continuous Tone (CT) format.

BACKGROUND OF THE INVENTION

Digital printing involves direct printing of digital information onto a printing substrate. As shown in FIG. 1 to which reference is now made, a digital printing system 10 includes a front end computer 11 which operates to prepare the data in a format suitable for use by a printing apparatus 12 which prints the image to be printed on a printing substrate in accordance with the digital representation thereof. Front end computer 11 and printing apparatus 12 are connected by a communication cable 13.

In the prior art, front end computer 11 usually includes a composite file storage unit 14 which stores the digital representation of the images to be printed in a composite format, i.e. a CT file for each color separation to be printed and a single LW file. Usually, but not necessarily, the CT file for each separation and the single LW file represent the four process colors to be printed, namely Cyan, Magenta, Yellow and Black ("CMYB" or "CMYK").

As is well known in the art, LW files are represented in a run length encoding format, i.e. a compressed lossless format wherein pluralities of pixels having the same color are represented by a vector indicating the number of pixels having that color whereas CT files are raster files wherein the color of each pixel is independently stored.

Digital printing systems are usually capable of electronic collation, i.e. the ability to print a full document where each or at least some pages are different from each other and/or are capable to print variable information, i.e. different information on each printed copy, such as a recipient name and address. Therefore, the ability of a digital printing system to address these various needs depends on the ability of front end computer 11 to feed the printing apparatus 12 with the required data efficiently.

In operation, CPU 15 retrieves a composite file of an image to be printed from storage unit 14, transfers it to an image buffer 16 and therefrom via interface 16 and communication cable 13 to printing apparatus 12 for printing. This sequence is usually a "pipe line" sequence, i.e. while the composite file of one separation is transmitted from image buffer 16 to printing apparatus 12, the composite file representing the next separation is retrieved from storage unit 14.

Composite files are voluminous and therefore, the retrieval thereof by CPU 15 and their transmission to printing apparatus 12 is a relatively inefficient, time consuming process which adversely effects the number of prints per unit of time which digital printing system 10 provides.

SUMMARY OF THE INVENTION

An object of the present invention is to provide a printing system having an improved front end computer capable of providing data to a printing apparatus of the thereof efficiently and rapidly.

Another object of the present invention is to provide a digital printing system having an improved front end computer which is operative to provide data in an improved LW and/or CT formats.

A further object of the present invention is to provide an improved method for providing data to a printing apparatus of a printing system.

Yet a further object of the present invention is to provide an improved method for providing data to a printing apparatus which forms part of a digital printing system.

Yet another object of the present invention is to provide an improved LW format.

Yet another object of the present invention is to provide an improved CT format.

There is thus provide, in accordance with a preferred embodiment of the present invention, a method for employing a digital representation of a color image to be printed in a printing system which includes the following steps:

a. generating at least one raster representation of the color image to be printed and a run length representation of the color image wherein the high resolution representation includes a plurality of files, each file storing information representing a single color to be printed; and a run length file including at least the run length information of the color to be printed. Preferably, each one of the plurality of files including at least an indication for each pixel whether to print the raster representation or the run length representation; and b. providing the at least one raster representation and the run length representation to a printing apparatus of the printing system.

There is also provided, in accordance with a preferred embodiment of the present invention, a method for employing a digital representation of a color image to be printed in a printing system which includes the following steps:

a. generating a run length representation of the color image to be printed and at least one raster representation of the color image wherein the generating the at least one raster representation includes the step of compressing the at least one raster representation; and b. providing the decompressed run length representation and the at least one raster representation to a printing apparatus of the printing system wherein the providing includes the step of decompressing the compressed at least one raster representation.

According to a further embodiment of the present invention, the step of generating the at least one raster representation includes the steps of dividing each of the at least one raster representation into a plurality of segments, and compressing each of the segments so as to enable to decompress each of the segments independently.

Further, the step of providing includes the steps of associating each of the segments with a corresponding portion of the run length representation; decompressing each of the segments and its corresponding portion; merging each of the segments with its corresponding portion; and sending the merged segments for printing by the printing apparatus.

According to yet another preferred embodiment of the present invention, any selected combination of the steps of the preferred methods described hereinabove is provided.

Further, according to a preferred embodiment of the present invention, the run length representation is a LW representation and the raster representation is a CT representation. Additionally, the run length representation and raster representation are generated from a composite representation including both the run length and raster representations.

Still further, the colors to be printed are four process colors (CMYK) and wherein the plurality of files include four files, each of each of the four process colors (CMYK).

In accordance with a preferred embodiment of the present invention, the printing system is a digital printing system, the printing apparatus is a half-tone images based printing apparatus or an ink-jet printing apparatus.

There is also provided, according to a preferred embodiment of the present invention, a printing system including means for carrying any combination of the steps of any of the preferred embodiments of the present invention.

Finally, there are provided prints produced in accordance with any of the preferred embodiments of the present invention.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
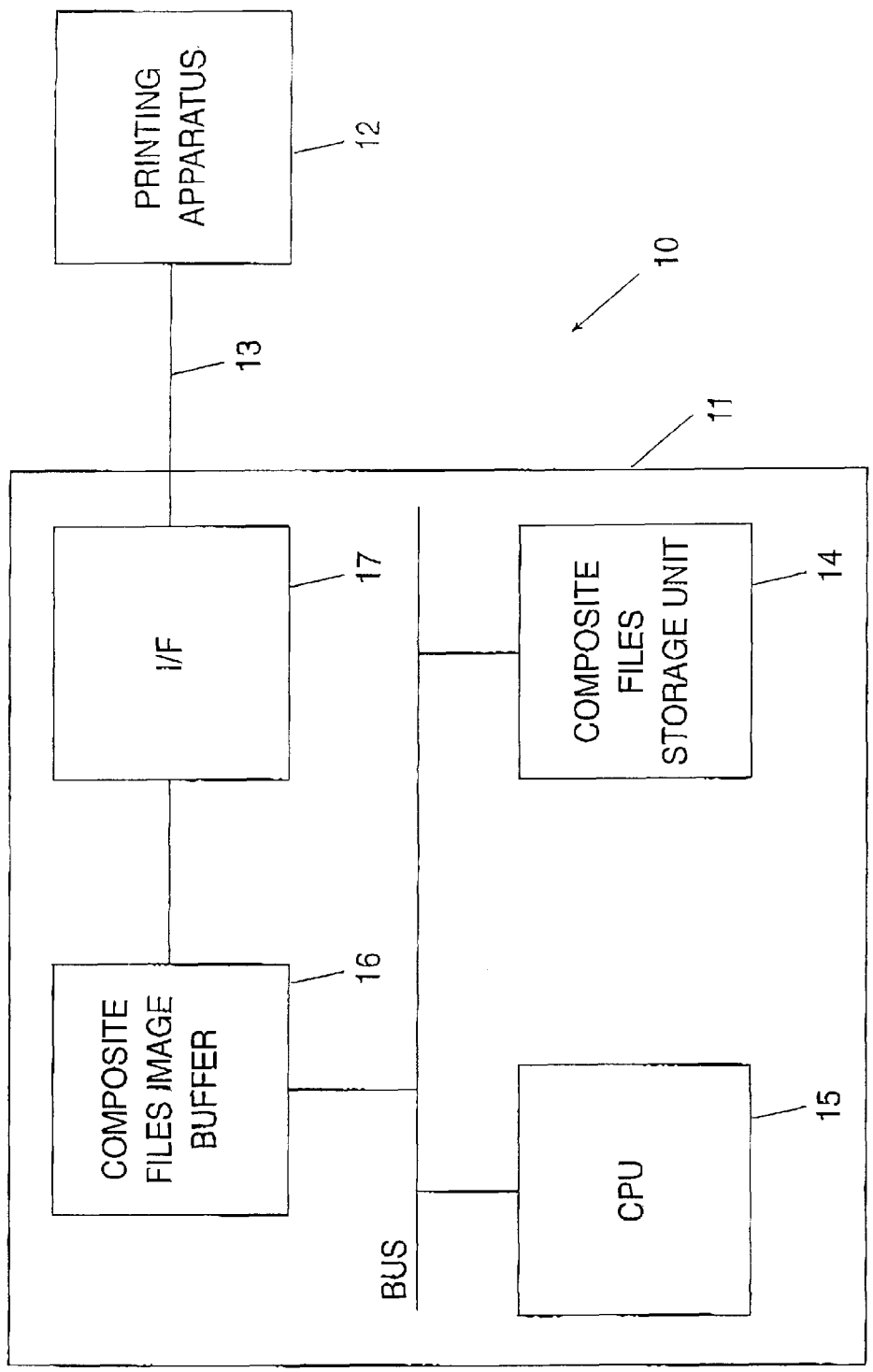
FIG. 1 is a schematic block diagram illustration of a prior art digital printing system.
Figure 2:
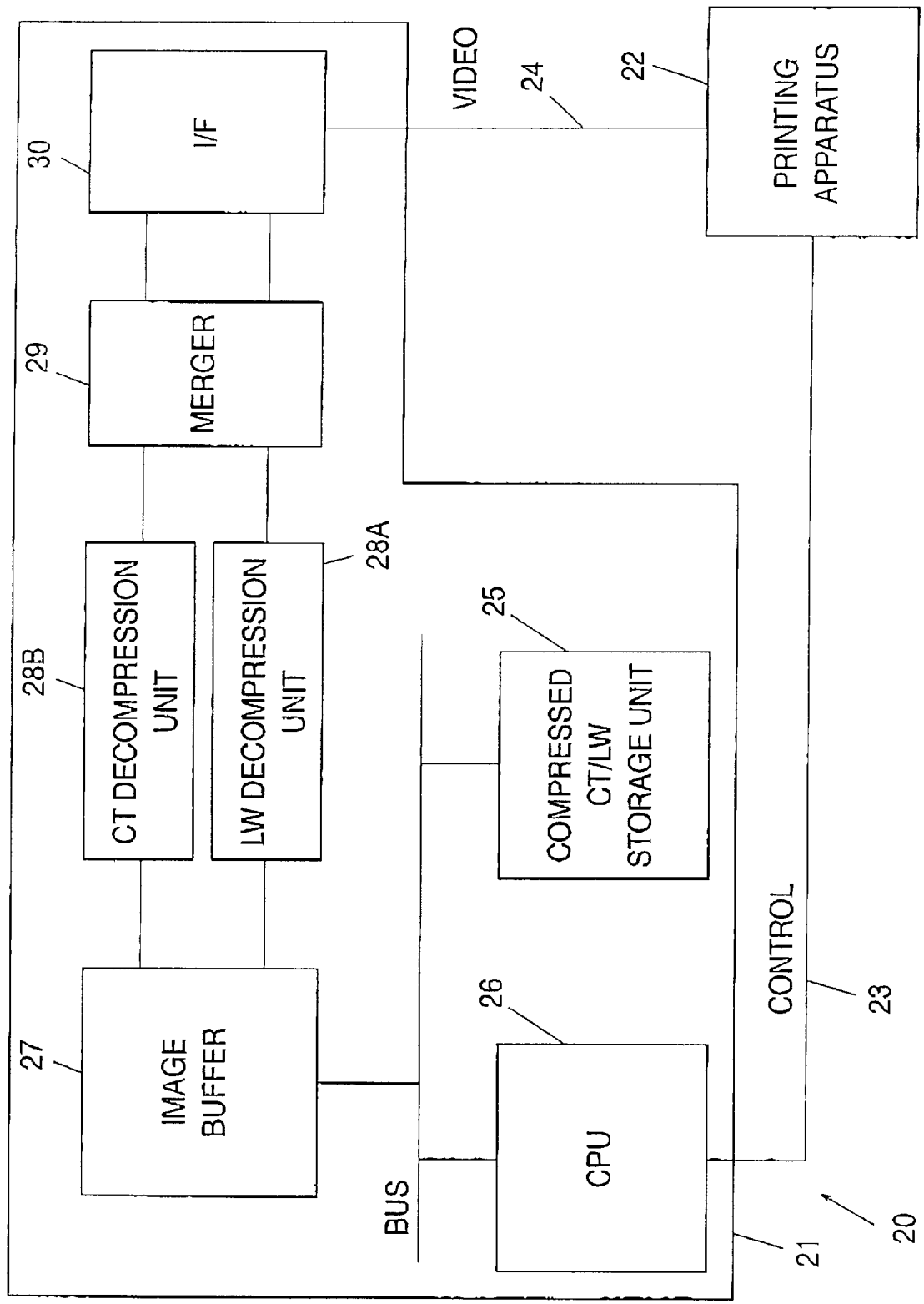
FIG. 2 is a schematic block diagram illustration of a digital printing system, constructed and operative according to a preferred embodiment of the present invention.

Reference is now made to FIG. 2 which is a block diagram illustration of a printing system, generally referenced 20, constructed and operative according to a preferred embodiment of the present invention.

Digital printing system 20 comprises a front end computer 21 and a printing apparatus 22. Non-limiting examples of a front end computer 21 and a printing apparatus are a POWER PC CPU based MOTOROLA INC. workstation and the Apex, commercially available from Xerox of the USA Front end computer 21 and digital printing apparatus 22 are connected via any suitable communication link, preferably having a control channel 23 and a video channel 24. Front end computer 21 comprises a storage unit 25, a CPU 26, an image buffer 27, a run length encoded files decompression unit 28A and a raster files decompression unit 28B, a merge unit 29 and a printing apparatus 22 interface 30.

In a preferred embodiment, the run length encoded files are LW files and the raster files are CT files. The LW files usually include text information in high resolution whereas the CT files include low resolution information (e.g. tint) the resolution of which is increased before printing to match the resolution of the LW.

A particular feature of front end computer 21 is that it stores, processes and provides files to printing apparatus 22 in an improved format for more efficient and rapid printing. In a preferred embodiment, the single LW file of the prior art is separated into a plurality of files, one for each color and an additional file which includes the run length information.

Alternatively, or in addition, according to a further preferred embodiment of the present invention, the raster files, the CT file for each color is being compressed, preferably according to the JPEG compression standard.

Figure 3:
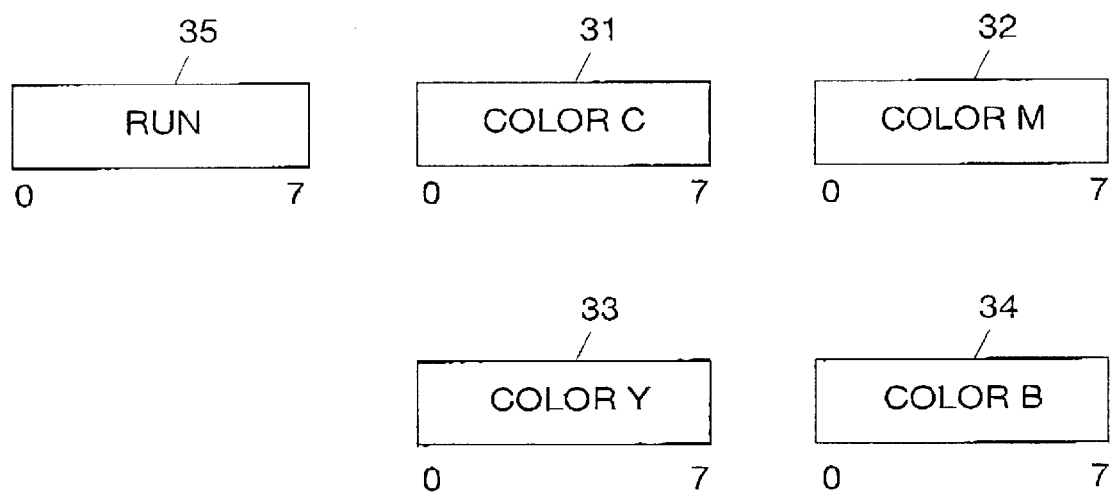
FIG. 3 is a representation of a LW representation of an image according to a preferred embodiment of the present invention.

In one preferred embodiment, the run length encoded representation, preferably but not necessarily the LW representation of each image to be printed is stored in a format 30 which includes five files as shown in FIG. 3 to which reference is now made. Each file represents a single color to be printed and control information indicating whether the LW or the CT information is to be printed for each color for each pixel.

In the non-limiting illustrated embodiment, each of files 31–34 represents one of the CMYK process color and its control. A run length file 35 includes the run length information of all color files 31–34. Alternatively, additional files representing special colors (e.g. spot colors) may be added or replace any of files 31–34.

It will be appreciated that representation 30 is highly advantageous since digital printing apparatus 22 typically prints each process color separately. Therefore, in operation each of the CMYK files 31, 32, 33 and 34 is separately handled by front end computer 21, thereby a smaller volume of data is handled each time whereby printing data is more effectively provided to printing apparatus 22.

Correspondingly, the CT data is arranged in four corresponding files each including the CT representation of the corresponding color of the CMYK colors.

According to another preferred embodiment of the present invention, each of the CT files corresponding to LW files 31–34 may be compressed, preferably according to JPEG standard.

In operation, printing apparatus 22 prints on the same printed substrate each color of the CMYK colors separately. According to the present invention, the LW representation 32 (Magenta representation) and its corresponding CT representation are provided to printing apparatus 22 while Cyan is printed thereby. In this pipeline fashion each color is provided whereas a previous color is being printed.

In the illustrated embodiment, CPU 26 retrieves the files, CT, LW and run length of a single color, say Cyan for temporary storage in image buffer 27. The CT and LW are then decompressed by corresponding LW and CT decompression units 28A and 28B and are merged in merger unit 29 into a single file sent via interface 30 for printing.

It will be appreciated that the separated LW files and/or the compressed CT files may be produced from any prior art composite file. For example, the prior art composite file may be an output of a Scitex Ripro System application, commercially available from Scitex corporation Ltd. of Herzlia, Israel.

Figure 4:
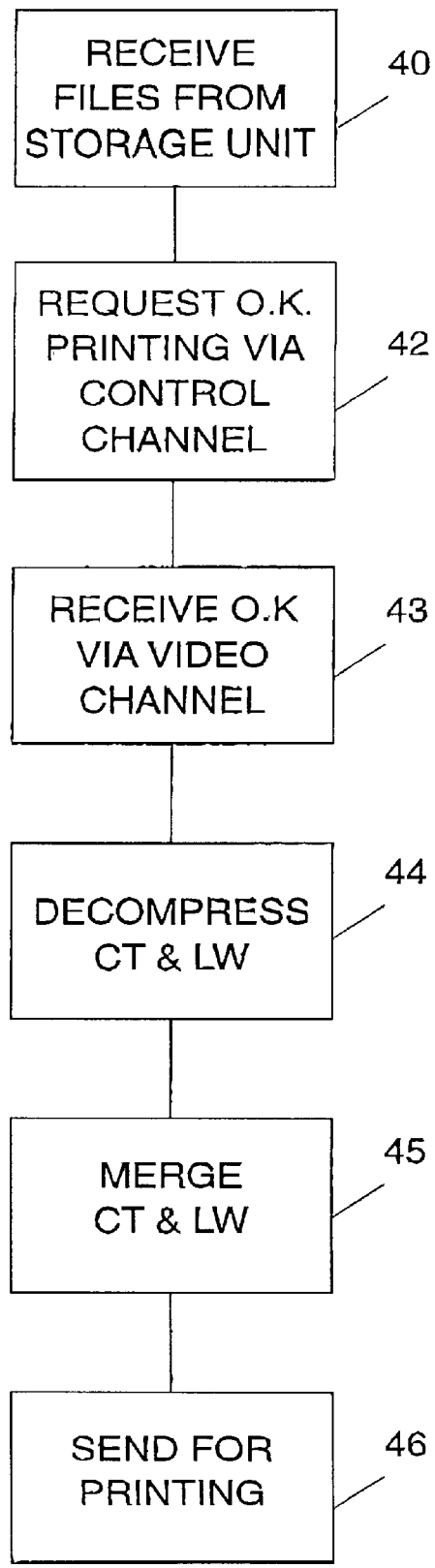
FIG. 4 is a schematic flow chart of a preferred method for operating the digital printing system of FIG. 2.

A preferred printing method employing the system of FIG. 2 and the data formats of FIG. 3 is now described in detail with reference to FIG. 4.

In step 40, CPU 26 retrieves a CT file, preferably a compressed CT file, the corresponding LW file, say the magenta file 32 and the LW run length file 35 and stores it in image buffer 27. In step 42, CPU 26 requests a confirmation from printing apparatus 22 that it is ready to print via control channel 23. In return, as indicated by step 43, printing apparatus 22 sends an O.K. ready indication to print signal via video channel 24. The LW and CT files are then sent to decompression units 28A and 28B, respectively for decompression as indicated by step 44.

In 45, the LW and CT information are merged in merger unit 29, i.e. the control indication for each pixel stored in the LW. file indicates whether the CT or LW information should be printed for each pixel and in step 46, pixels of the merged file are being sequentially sent to printing apparatus 22 via interface 30.

It will be appreciated that by representing the LW information in a plurality of files, each representing a different color corresponding to a CT file, the data is provided to the printing apparatus which prints each color separately more efficiently and rapidly.

Figure 5:
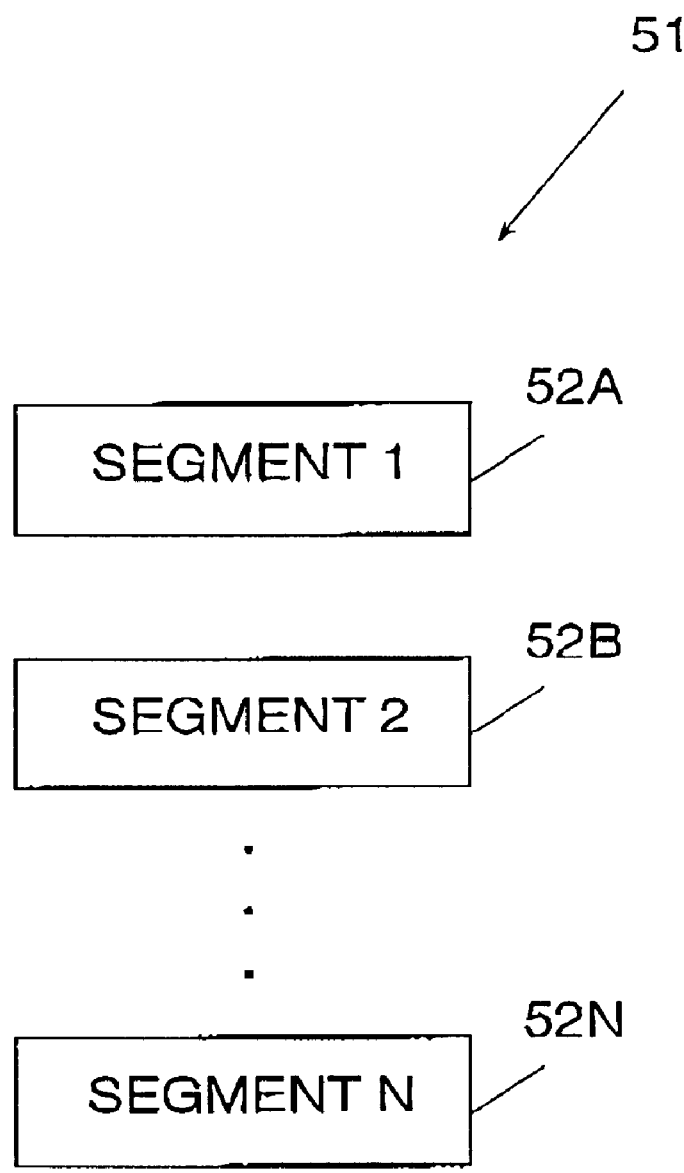
FIG. 5 is a representation of a CT representation of an image according to a second preferred embodiment of the present invention.

According to a further embodiment of the present invention, the CT files may be separated into segments, each segment representing a portion of a single file. As shown in FIG. 5 to which reference is now made, a CT file 51, say the Cyan CT file corresponding to LW file 31 is divided into a plurality of segments 52 of which segments 52A, 52B and 52N are shown here as non limiting examples. Each segment 52 may be compressed in the standard JPEG compression format as above.

In an exemplary non-limiting embodiment, each segment 52 includes information covering 8 full lines of the image to be printed, therefore if each line includes 4 Kbytes information each segment includes 32 Kbytes of information, a volume which is easily handled by front end computer 21.

It will be appreciated that since the LW information is stored in a run length format according to the lines of the image to be printed, it is readily available for processing with the segments of the CT file 51 as described hereinbelow.

Figure 6:
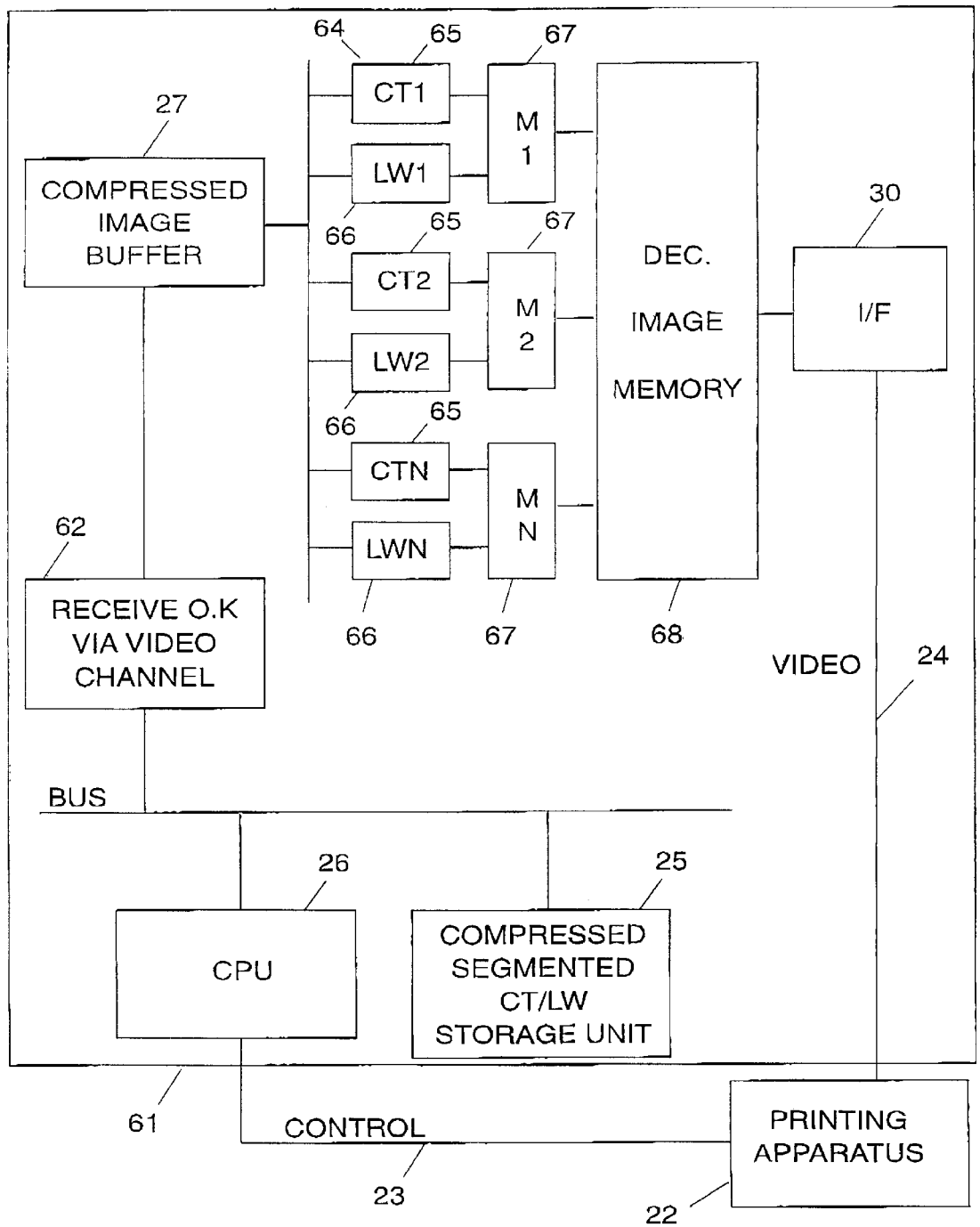
FIG. 6 is a schematic block diagram of a digital printing system, constructed and operative according to a second preferred embodiment of the present invention and employing the CT files of FIG. 5.

According to a preferred embodiment of the present invention, as shown in FIG. 6 to which reference is now made, an improved front end computer 61 storing, processing and providing data to printing apparatus 22 is provided. Front end computer 61 comprises in addition to storage unit 25 and CPU 26 and image buffer 27 an additional processor 62 for controlling the decompression of the CT and LW segments as described in detail hereinbelow.

Front end computer also comprises a LW and CT segments decompression unit 64 which comprises a plurality of CT decompression units 65 of which three designated CT1, CT2 and CTN are shown as a non limiting example, a plurality of LW decompression units 66 of which three designated LW1, LW2 and LWN are shown as a non limiting example and a plurality of merge units 67 of which three, referenced M1, M2 and MN are shown in the illustrated embodiment as a non limiting example.

Front end computer 61 also comprises a decompressed file image memory 68 and an interface 30. In operation, CPU 26 of front end computer 61 retrieves segments of the CT file and a corresponding segment of the LW file from storage 25 to image buffer 27. The retrieved CT and LW segments are then provided to segments decompression units 65 and 66, respectively, which decompress, preferably but not necessarily in parallel, the segments of the CT and LW representation of the color being processed. Each CT and LW segments are then being merged by mergers 67 which provide them to decompressed image buffer 68.

Preferably, merged segments of the digital representation of the processed color are being sent as segments in the correct order via interface 30 for printing by printing apparatus 22.

It will be appreciated that the method described hereinabove with respect to FIG. 4 may be employed by front end computer 61 as well wherein the retrieving step 40, the decompression step 44, the merging step 45 and the step 46 of sending to printing are done for segments and not for the entire representation of the color to be printed.

A particular feature of the embodiment of FIG. 6 is that the segmentation enables to employ a number of decompression units which are operative simultaneously to decompress the CT and LW information of a single color, thereby to provide the printing data to printing apparatus 22 more rapidly and efficiently.

It will be appreciated that the preferred embodiments described hereinabove are described by way of example only and that numerous modifications thereto, all of which fall within the scope of the present invention, exist. For example, while the present invention has been described with respect to a decompression unit which is operative to decompress the CT and LW information representing a single color, the same decompression unit may be used in sequence to provide the printing data to printing apparatus 22. Alternatively or in addition, a number of processing units may process substantially simultaneously, partially simultaneously or in sequence CT and LW information representing all colors to be printed.

Another example is that while the present invention has been described with respect to the LW and CT formats, it equally applies to any run length and raster formats. Further, while the present invention has been described with respect to a digital printing system, it equally applies to any printing system for providing more efficient and rapid data to the printing apparatus thereof. Still further, it will be appreciated that the printing apparatus may be any printing apparatus, e.g. a continuous ink-jet printing apparatus, or a printing apparatus printing images from half-tone information as described hereinabove.

Yet another example is that the present invention is not limited to a single CT file of the image to be printed. The present invention equally applies to any number of CT files within an image to be printed.

It will be appreciated by persons skilled in the art that the present invention is not limited by what has been particularly shown and described herein above. Rather the scope of the invention is defined by the claims which follow:

I claim:

1. A method for employing a digital representation of a color image to be printed in a printing system, the method comprising the steps of:
   a. generating at least one raster representation of said color image to be printed and a run length representation of said color image wherein said run length representation comprises:
      i) a plurality of files, each file storing information representing a single color to be printed; and
      ii) a run length file including at least the run length information of said color to be printed; and
   b. providing said at least one raster representation and said run length representation to a printing apparatus of the printing system.

2. A method according to claim 1 wherein said printing system is a digital printing system.

3. A method according to claim 1 wherein each one of said plurality of files including at least an indication for each pixel whether to print said raster representation or said run length representation.

4. A method according to claim 1 wherein said run length representation is a LW representation and said at least one raster representation is a CT representation.

5. A method according to claim 4 wherein said colors to be printed are four process colors (CMYK) and wherein said plurality of files include four files, each of each of the four process colors (CMYK).

6. A method according to claim 1 wherein said generating of said at least one raster representation comprises the step of compressing said at least one raster representation and the step of decompressing said at least one raster representation prior to said providing.

7. A method according to claim 1 wherein said generating of said at least one raster representation comprises the steps of:
   a. dividing each said at least one raster representation into a plurality of segments; and
   b. compressing each of said segments so as to enable to decompress each of said segments independently.

8. A method according to claim 7 wherein said providing comprising the steps of:
   a. associating each of said segments with a corresponding portion of said run length representation; and
   b. decompressing each of said segments and its corresponding portion;
   c. merging each of said segments with its corresponding portion; and
   d. sending each of said merged segments and portions for printing by said printing apparatus.

9. A method according to claim 1 wherein said generating comprises generating said run length representation and at least one raster representation from a composite representation including both said run length representation and said at least one raster representation.

10. A method according to claim 1 wherein said printing apparatus is a half-tone images printing apparatus or an ink-jet printing apparatus.

11. A method for employing a digital representation of a color image to be printed in a printing system, the method comprising the steps of:
   a. generating a run length representation of said color image to be printed and at least one raster representation of said color image wherein said generating said at least one raster representation comprises the step of compressing said at least one raster representation; and
   b. providing said decompressed run length representation and said at least one raster representation to a printing apparatus of the printing system wherein said providing comprises the step of decompressing said compressed at least one raster representation.

12. A method according to claim 11 wherein said generating of said at least one raster representation comprises the steps of:
   a. dividing each of said at least one raster representation into a plurality of segments; and
   b. compressing each of said segments so as to enable to decompress each of said segments independently.

13. A method according to claim 12 wherein said providing comprising the steps of:
   a. associating each of said segments with a corresponding portion of said run length representation;
   b. decompressing each of said segments and its corresponding portion;
   c. merging each of said segments with its corresponding portion; and
   d. sending said merged segments for printing by said printing apparatus.

14. A method according to claim 11 wherein said printing system is a digital printing system.

15. A method according to claim 11 wherein said generating of said run length representation comprises:
   a. generating a plurality of files, each file storing information representing a single color to be printed; and
   b. generating a run length file including at least the run length information of said color to be printed.

16. A method according to claim 11 wherein each one of said plurality of files including at least an indication for each pixel whether to print said run length representation or said raster representation.

17. A method according to claim 11 wherein said run length representation is a LW representation and said raster representation is a CT representation.

18. A method according to claim 15 wherein said colors to be printed are four process colors (CMYK) and wherein said plurality of files include four files, each of each of the four process colors (CMYK).

19. A method according to claim 11 wherein said generating comprises generating said run length representation and raster representation from a composite representation including both said run length and raster representations.

20. A method according to claim 11 wherein said printing apparatus is a half-tone images based printing apparatus or an ink-jet printing apparatus.

21. A printing system employing a digital representation of a color image to be printed in a printing system, comprising:
   a. means for generating at least one raster representation of said color image to be printed and a run length representation of said color image wherein said run length representation comprises:
      i) a plurality of files, each file storing information representing a single color to be printed; and
      ii) a run length file including at least the run length information of said color to be printed; and
   b. means for providing said at least one raster representation and said run length representation to a printing apparatus of the printing system.

22. A system according to claim 21 wherein said printing system is a digital printing system.

23. A system according to claim 21 wherein each one of said plurality of files including at least an indication for each pixel whether to print said raster representation or said run length representation.

24. A system according to claim 21 wherein said run length representation is a LW representation and said at least one raster representation is a CT representation.

25. A system according to claim 24 wherein said colors to be printed are four process colors (CMYK) and wherein said plurality of files include four files, each of each of the four process colors (CMYK).

26. A system according to claim 21 wherein said means for generating said at least one raster representation comprises means for compressing said at least one raster representation and means for decompressing said at least one raster representation prior to the operation of said means for providing.

27. A system according to claim 21 wherein said means for generating said at least one raster representation comprises the steps of:
   a. means for dividing each said at least one raster representation into a plurality of segments; and
   b. means for compressing each of said segments so as to enable to decompress each of said segments independently.

28. A system according to claim 27 wherein said means for providing comprising:
   a. means for associating each of said segments with a corresponding portion of said run length representation; and b. means for decompressing each of said segments and its corresponding portion;

c. means for merging said each of said segments with its corresponding portion; and d. means for sending each of said merged segments and portions for printing by said printing apparatus.

29. A system according to claim 21 wherein said generating comprises generating said run length representation and at least one raster representation from a composite representation including both said run length representation and said at least one raster representation.

30. A system according to claim 21 wherein said printing apparatus is a half-tone images printing apparatus or an ink-jet printing apparatus.

31. A printing system employing a digital representation of a color image to be printed comprising:

a. means for generating a run length representation of said color image to be printed and at least one raster representation of said color image wherein said means for generating said at least one raster representation comprises means for compressing said at least one raster representation; and b. means for providing said decompressed run length representation and said at least one raster representation to a printing apparatus of the printing system wherein said means for providing comprises the means for decompressing said compressed at least one raster representation.

32. A system according to claim 31 wherein said means for generating said at least one raster representation comprises:

a. means for dividing each of said at least one raster representation into a plurality of segments; and b. means for compressing each of said segments so as to enable to decompress each of said segments independently.

33. A system according to claim 32 wherein said means for providing comprises:

a. means for associating each of said segments with a corresponding portion of said run length representation;

b. means for decompressing each of said segments and its corresponding portion;

c. means for merging each of said segments with its corresponding portion; and d. means for sending said merged segments for printing by said printing apparatus.

34. A system according to claim 31 wherein said printing system is a digital printing system.

35. A system according to claim 31 wherein said means for generating said run length representation comprises:

a. means for generating a plurality of files, each file storing information representing a single color to be printed; and b. means for generating a run length file including at least the run length information of said color to be printed.

36. A system according to claim 31 wherein each one of said plurality of files including at least an indication for each pixel whether to print said run length representation or said raster representation.

37. A system according to claim 31 wherein said run length representation is a LW representation and said raster representation is a CT representation.

38. A system according to claim 35 wherein said colors to be printed are four process colors (CMYK) and wherein said plurality of files include four files, each of each of the four process colors (CMYK).

39. A system according to claim 31 wherein said means for generating comprises means for generating said run length representation and raster representation from a composite representation including both said run length and raster representations.

40. A system according to claim 31 wherein said printing apparatus is a half-tone images based printing apparatus or an ink-jet printing apparatus.

* * * * *